United States Patent [19]

Cossé

[11] Patent Number: 4,469,218

[45] Date of Patent: Sep. 4, 1984

[54] METHOD AND DEVICE FOR DIVIDING A ROW OF IDENTICAL SOLID PRODUCTS

[75] Inventor: Lionel Cossé, Nantes, France

[73] Assignee: Biscuiterie Nantaise - BN, Nantes, France

[21] Appl. No.: 377,098

[22] Filed: May 11, 1982

[30] Foreign Application Priority Data

May 22, 1981 [FR] France ................. 81 10259

[51] Int. Cl.$^3$ ............................................. B65G 47/26
[52] U.S. Cl. ...................................... 198/438; 193/45
[58] Field of Search ................... 198/438, 380, 400; 193/45, 47; 406/181, 86, 87, 88

[56] References Cited

U.S. PATENT DOCUMENTS

| | | | |
|---|---|---|---|
| 3,058,570 | 10/1962 | Hansen | 198/597 |
| 3,115,961 | 12/1963 | Layton, Jr. | 198/442 |
| 3,185,277 | 5/1965 | Agnew | 198/438 |
| 3,306,425 | 2/1967 | Rapp, Jr. et al. | 198/380 |
| 3,614,168 | 10/1971 | Range | 198/832 |
| 3,685,632 | 8/1972 | Brady | 198/438 |
| 3,833,111 | 9/1974 | Sterling et al. | 198/380 |
| 4,203,510 | 5/1980 | Reed | 198/438 |
| 4,214,656 | 7/1980 | McDonald et al. | 198/380 |

FOREIGN PATENT DOCUMENTS 1081923 9/1967 United Kingdom .

*Primary Examiner*—Joseph E. Valenza
*Assistant Examiner*—Kyle E. Shane
*Attorney, Agent, or Firm*—Karl W. Flocks; Sheridan Neimark; A. Fred Starobin

[57] ABSTRACT

Method for dividing a row of identical solid products brought in on an input conveyor along the axis of symmetry of the latter, from an upstream delivery apparatus to two output conveyors connected respectively to two downstream receiving apparatuses, said products emerging from the delivery apparatus resting flat on their largest surface on said input conveyor, said method including the steps of disposing tipping means comprising an entry dihedral with two tipping surfaces so that the ridge of said dihedral is aligned with said axis of symmetry of the input conveyor; bringing the products coming from the input converyor to pass successively over the ridge of said dihedral; conferring a minimum rectilinear speed on said input conveyor, so that said products are placed successively in equilibrium on said ridge; causing each of said products to tilt onto a selected tipping surface of the dihedral by applying selectively to the upper surface of the products in equilibrium, a compressed air jet oriented towards the selected tipping surface, and transporting separately the thus tipped products on to each of the two output conveyors to the respective downstream apparatuses. Method applicable to bags of biscuits.

3 Claims, 2 Drawing Figures

METHOD AND DEVICE FOR DIVIDING A ROW OF IDENTICAL SOLID PRODUCTS

BACKGROUND OF THE INVENTION

The present invention relates to a method for dividing a row of identical solid products, such as bags of biscuits, during their transfer between an upstream delivery apparatus and two downstream receiving apparatuses. The invention covers, in addition, a device for practicing the above-mentioned method.

In the field of mass-production, it is frequently necessary to divide a row of products during their transfer between two consecutive machines forming part of a manufacturing chain, in particular in the case where the capacity of the downstream machine is distinctly less than the delivery rate of the upstream machine. To this end, mechanical or electromechanical devices have already been developed, intended to orient the products towards the left or the right with respect to their original direction. However these devices have numerous drawbacks, particularly a limited working rate and rapid wear which can result in deterioration of the products in the case of breakdown or poor operation.

SUMMARY OF THE INVENTION

It is an object of the present invention to overcome these drawbacks by providing a method and a device enabling a row of products to be divided without any mechanical part being in contact with the latter, so that any possible wear is reduced to a practically nil value and cannot result in any waste, whilst enabling a high operating rate to be achieved.

According to the invention, in a method for dividing a row of identical solid products during their transfer between an upstream delivery apparatus and two downstream receiving apparatuses, the products emerging from the delivery apparatus being guided in a row and resting flat on their largest surface, the products coming from the upstream apparatus are led to pass successively over the ridge of a dihedral member, substantially aligned with the axis of said guided row, conferring on them a minimum rectilinear speed, so that they substantially come in equilibrium on said ridge, causing each of the products to tilton to one tipping surface or the other of the dihedral by applying selectively to the upper surface of the product in equilibrium a compressed air jet oriented towards the selected tipping surface, and separately transporting said tipped products to the respective downstream apparatuses.

According to another feature of the method, the air jet is oriented alternately towards the two surfaces of the dihedral automatically.

For practicing the above method, the device according to the invention comprises essentially tipping means including an input arranged opposite the downstream end of an input conveyor associated with the upstream delivery apparatus and two outputs each arranged opposite the upstream end of an output conveyor associated with one of the downstream receiving apparatuses, the input of the tipping means having the form of dihedral member whose ridge is substantially aligned with the axis of symmetry of the active strand of the downstream end of the input conveyor and of which each of the two surfaces is joined to a toboggan run whose lower end forms one of the outputs of the tipping means, and a compressed air source connected to a distributor mounted transversely above the dihedral member and including two air ejection nozzles each oriented towards one of the surfaces of the dihedral-member and separately obturatable.

According to other features of the device according to the invention:

an electrovalve is associated with each nozzle and is remote-controlled;

the electrovalves are controlled by an electronic computing unit, if necessary depending on a detector for the presence of the products;

the distributor comprises a fixed transverse pipe, supplied continuously with compressed air and including at the level of its lower surface two orifices each formed straight above one of the surfaces of the dihedral, and a rotary sleeve surrounding the pipe with a slight clearance at the level of the lower surface of the latter and including alternate peripheral ports formed respectively opposite the orifices of the pipe, the rotation of the sleeve being synchronizable with the movement of the input conveyor.

BRIEF DESCRIPTION OF THE DRAWINGS

Other features and advantages of the present invention will emerge better from the description which follows, in association with the accompanying drawings in which.

In these drawings, the same reference numerals denote the same elements.

DESCRIPTION OF THE PREFERRED EMBODIMENTS

Figure 1:
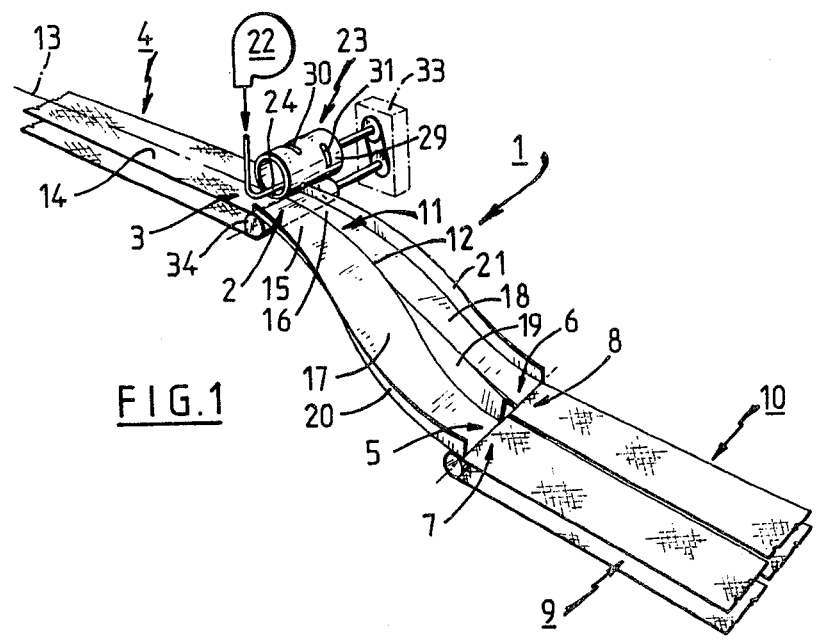
FIG. 1 shows a partial diagrammatic perspective view of a preferred embodiment of a device illustrating the method according to the invention.
Figure 2:
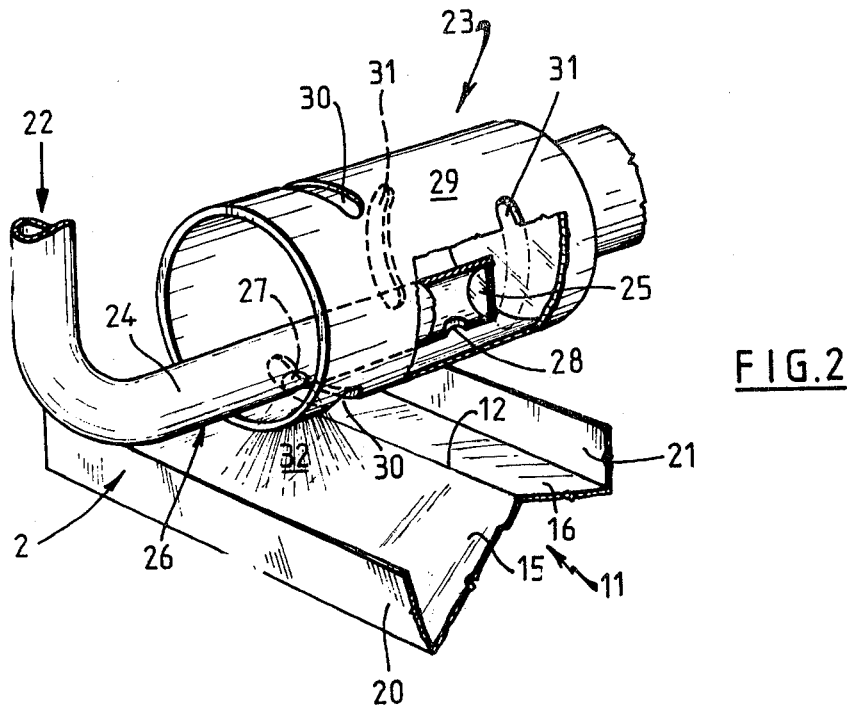
FIG. 2 shows a diagrammatic perspective view of a detail of the embodiment shown in FIG. 1.

Referring to FIGS. 1 and 2, the method for dividing a row of identical solid products (not shown) during their transfer between an upstream delivery apparatus (not shown) and two downstream receiving apparatuses (not shown) is of the type in which the products issuing from the delivery apparatus are guided in a row and rest flat on their largest surface. For example, the products may be packets of biscuits coming from a wrapping machine and en route to two different packaging machines or to two inputs of a single packaging machine. As will be better understood following the rest of the present description, the products may be of any nature provided that their geometric shape is substantially constant and that their weight only varies within limits compatible with the equipment used. Preferably, the products have both a large lower supporting surface and a large upper surface.

In the first place, the device for practicing the method according to the invention comprises a tipping means 1 having an input 2 arranged opposite the downstream end 3 of an input conveyor 4 associated with the upstream delivery apparatus and two outputs 5 and 6 each arranged opposite the upstream end 7, 8 of an output conveyor 9, 10 associated with one of the downstream receiving apparatuses.

It is clear that the two output conveyors 9 and 10 can correspond to two separate conveyors supplying different machines or to two neighboring rows on the same conveyor supplying two inputs of a single machine. These conveyors, particularly the input conveyor 4, may be of the band, belt or link-chain type.

The input 2 of the tipping means 1 is in the form of a dihedral member 11 whose ridge 12 is substantially aligned with the axis of symmetry 13 of the active strand 14 of the downstream end 3 of the input conveyor 4. In the case where the input conveyor 4 is horizontal, the ridge 12 is generally horizontal, but its section preferably has a slightly convex or upwardly domed shape. In addition, each of the two surfaces 15 and 16 of the dihedral is joined to a toboggan run 17, 18 whose lower end forms one of the outputs 5 and 6 on the tipping means 1. The ridge 12 of the dihedral is extended by a separating and guiding barrier 19 at the level of the toboggan run 17 and 18, whilst a continuous lateral guide rim bounds each of the surfaces 15 and 16 of the dihedral externally and each of the toboggan runs 17 and 18 externally. The tipping means are preferably constituted by metal, for example stainless steel, the two surfaces 15 and 16 as well as the toboggan run 17 and 18 having dimensions compatible with those of the products to be handled.

In the second place, the device according to the invention comprises a compressed air source 22 connected to a distributor 23 mounted transversely above the dihedral 11 and including two air injection nozzles each oriented towards one of the surfaces 15 and 16 of the dihedral and separately obturatable, for example, by means of an electrovalve associated with each nozzle and remote-controlled. The electrovalves can be controlled by an electronic computing unit, if necessary depending on a detector for the presence of products mounted at the level of the downstream end 3 of the input conveyor 4.

Under these conditions, the method according to the invention consists, on the one hand, of bringing the products coming from the upstream apparatus, that is to say the products guided in a row on the input conveyor 4, to pass successively over the ridge 12 of the dihedral 11, which is substantially aligned with the axis 13 of the row or of the conveyor 4, by conferring on them a minimum rectilinear speed oriented along the axis of the conveyor, so that said products are led to come one after the other substantially in equilibrium on said ridge 12 and, on the other hand, to cause each of the products to tilt onto one tipping surface or the other, 15 or 16, of the dihedral 11, by applying selectively to the upper surface of the product in equilibrium a compressed air jet oriented towards the selected tipping surface 15 or 16, the tipped products then being conveyed separately, by the toboggan runs 17 and 18 and the output conveyors 9 and 10, to the respective downstream apparatuses.

According to the foregoing, the selective actuation of the electrovalves enables the selection as desired of the tipping side or surface 15 or 16 for each product presented in equilibrium on the ridge 12, under the effect of the speed communicated by the input conveyor 4. Consequently, it is possible to vary from 0 to 100% the number of products tipped on to one of the toboggan runs 17 or 18 with respect to the number of products entering the tipping means 1, the number of products tipped on to the other toboggan run corresponding to the difference or the complement to 100. This variation in the percentage of products tipped on to one toboggan run with respect to the other can obviously be modified during the operation of the previously described unit, for example under the control of feelers arranged at the input of the downstream machines.

However, according to a preferred embodiment, the distributor 23 comprises a fixed pipe 24 which is mounted transversely above the dihedral 11 and which is continually supplied with compressed air through the source 22. The pipe 24 is closed at its end 25 and includes, at the level of its lower surface 26, two orifices 27 and 28 each formed straight above one of the surfaces 15 and 16 of the dihedral. In addition, the distributor 23 comprises a rotary sleeve 29 surrounding the pipe 24 with slight clearance at the level of the lower surface 26 of the latter and including alternate peripheral or peripherally off-set ports and arranged respectively opposite the orifices 27 and 28 of the pipe 24. For example, the rotary sleeve 29 includes, for each of the two orifices 27 and 28 of the pipe, a set of two diametrically opposite ports 30 or 31, the two sets 30 and 31 being off-set by 90° with respect to one another.

When the sleeve 29 is rotated, its wall forms an obturator with respect to the orifices 27 and 28 until one port 30 or 31 passes opposite one of these orifices, thus enabling compressed air to escape downwards and to form a jet 32 causing the tilting of the product then balanced on the ridge 12 of the dihedral.

It is obvious that the rotation of the sleeve 29 is advantageously synchronized with the moement of the input conveyor 4, for example by means of a belt and pulley unit 33 or a chain and gearwheel unit connecting the axle of the sleeve 29 to that of the roller 34 forming the downstream end 3 of the input conveyor 4. Under these conditions, the air jet is oriented alternately towards the two surfaces 15 and 16 of the dihedral 11, entirely automatically, and two output rows including the same number of products is obtained.

This preferred embodiment offers the advantage that it enables particularly high operating rates to be achieved, for example, 400 tips per minute, but it is not possible to vary the percentage of the products tipped on to each of the toboggan runs 17 and 18 without replacing the sleeve 29, which involves momentary stopping of the transfer assembly.

It should be noted that the length of the ports 30 and 31 generally takes into account the length and input speed of the products. In the case shown in FIGS. 1 and 2, the pitch of the ports 30 or 31 associated with one of the orifices 27 and 28 corresponds to double the pitch of the products, but is it obviously possible to modify the number of ports associated with each orifice as well as the diameter of the rotary sleeve 29. In addition, the shape and sizes of the orifices 27 and 28 and of the ports 30 and 31 must be adapted to the dimensions of the upper surface of the products and, obviously, to the distance separating the rotary sleeve 29 from said upper surface.

In addition, it is possible to combine in series or in parallel one or several of the previously described embodiments, particularly one or several rows of products transported without dividing the row, thus enabling multiplication of the number of rows or distribution of the number of products as desired.

It is well understood that the present invention has only been described and illustrated purely by way of explanatory example which is in no way limiting and that any useful modification could be introduced therein, particularly within the field of technical equivalents, without departing from its scope.

What is claimed is:

1. Device for dividing a row of identical solid products brought in on an input conveyor along the axis of symmetry of the latter, from an upstream delivery apparatus to two output conveyors respectively connected to two downstream receiving apparatuses, said products emerging from the delivery apparatus resting flat on their largest surface on said input conveyor, said device including tipping means comprising an input arranged facing the downstream end of the input conveyor associated with the upstream delivery apparatus and two outputs each arranged opposite the upstream end of the output conveyor associated with one of the downstream receiving apparatuses, the input of the tipping means having the form of a dihedral member whose ridge is substantially aligned with the axis of symmetry of said input conveyor and of which each of the two surfaces is joined to a toboggan run whose lower end forms one of the outputs of the tipping means, and a source of compressed air connected to a distributor mounted transversely above said dihedral and comprising a fixed transverse pipe, continually supplied with compressed air and including at the level of its lower surface opposite the tipping means two orifices each formed straight above one of the tipping surfaces, and a rotary sleeve surrounding the pipe with a slight clearance at the level of said lower surface of the pipe and including ports off-set peripherally respectively formed opposite said orifices of the pipe.

2. Device according to claim 1, wherein the rotary sleeve includes, for each of the two orifices of the pipe, a set of two diametrically opposite ports, the two sets being off-set by 90° from one another.

3. Device according to claim 1, wherein the rotation of the sleeve is synchronized with the movement of the input conveyor.

* * * * *